Nov. 3, 1959   A. SMITH ET AL   2,910,817
LAWN EDGER

Filed Oct. 19, 1955   5 Sheets-Sheet 1

INVENTORS
ALEXANDER SMITH
BURTON D. BAGGS, JR.

BY A. Yates Dowell
ATTORNEY

Nov. 3, 1959

A. SMITH ET AL 2,910,817

LAWN EDGER

Filed Oct. 19, 1955

INVENTORS
ALEXANDER SMITH
BURTON D. BAGGS, JR.

BY A. Yates Dowell

ATTORNEY

Nov. 3, 1959   A. SMITH ET AL   2,910,817
LAWN EDGER
Filed Oct. 19, 1955   5 Sheets-Sheet 4

INVENTORS
Alexander Smith
Burton D. Baggs, Jr.
BY
ATTORNEY

United States Patent Office 2,910,817
Patented Nov. 3, 1959

2,910,817

LAWN EDGER

Alexander Smith and Burton D. Baggs, Jr., Sanford, Fla.

Application October 19, 1955, Serial No. 541,402

9 Claims. (Cl. 56—25.4)

The present invention relates to power equipment for maintaining gardens and more particularly for maintaining the edges of lawns in a neat condition.

Heretofore, various types of lawn edging equipment have been provided including machines according to our previous applications, Serial No. 470,193, filed November 22, 1954, and Serial No. 505,376, filed May 2, 1955, of which the present application is an improvement. Although rotating type cutting disks have been known, they have not fully performed the operation of cutting a smooth edge and have also been dangerous to use because the rotating cutters could easily injure a person and damage buildings, tombstones, and other objects and/or equipment.

An object of the present invention is to overcome the shortcomings of the prior machines and to provide equipment for cutting vegetation close to the edges of sidewalks, buildings, tombstones, and the like without damage thereto.

A further object is to provide freely rotatable guarding discs which are not affected by the driving shaft, to prevent cutting discs from contacting surface markers and the like.

Another object is to provide a power machine for cutting weeds and cultivating vegetation, such as celery, and the like.

Further object of the invention is to provide hand guided power equipment for use in truck gardens.

Other and further objects will be apparent from the following description taken in conjunction with the accompanying drawings wherein.

Briefly the lawn edging machine of the present invention comprises a vehicle for movement along the ground, a motor mounted on the vehicle for vertical adjustment relative to the ground, a housing extended from the motor and carrying a freely rotatable guarding disc, which guarding disc may engage obstructions to prevent damage to the obstructions. Rotatable cutters are mounted on and driven by said machine closely adjacent the guarding discs, the cutting discs preferably being of smaller diameter than the guarding disc. The cutting discs may operate in a horizontal or vertical position by the substitution of different drives or attachments, and a brush may be mounted on one attachment for moving cut material aside.

Figure 1:
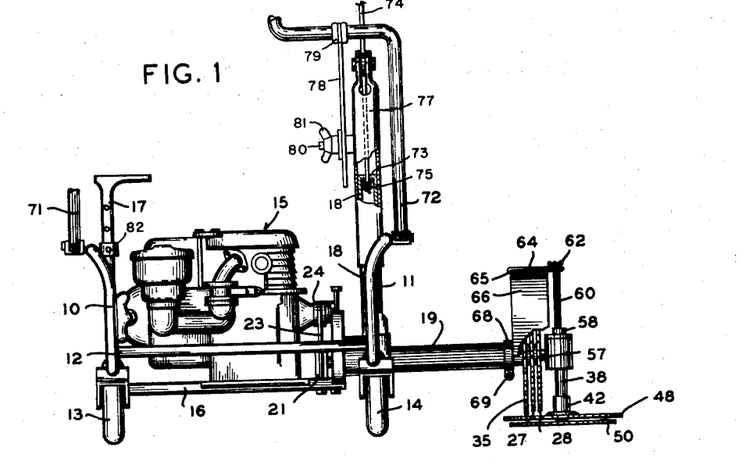
Fig. 1 is a front view with parts broken away and parts in section of one form of lawn edger showing both vertical and horizontal cutting and guarding discs in position and showing the means to adjust and maintain the cutting discs at a selected elevation with the cutter working at the ground level of a unit.

Referring more particularly to the drawing a vehicle including inverted U-shaped side frames 10 and 11 and transverse members 12 is supported by front caster wheels 13, 14 and rear wheels similar to those shown in application, Serial No. 470,193. A motor 15 supported on a cradle 16 is vertically and angularly adjustable by apertured rod 17 and slidable shaft 18 whereby the motor may be raised or lowered and pivoted about shaft 18 to various angles relative to the ground and to the direction of movement of the vehicle.

A shaft housing 19 is fixed to the cradle 16 and rotatably supports a power shaft 20 driven by means of a pulley 21 fixed to the shaft by a set screw 22 or the like and driven from the motor through a belt 23 driven by pulley 24 on the motor shaft. The inner end of the shaft 20 is rotatably supported by means of an anti-friction and thrust bearing 25 or the like. The shaft 20 has its outer end projecting from the outer end of the housing 19 and is provided with a threaded portion 26 on which cutting discs 27, 28 are secured by suitable means such as nut and washers as described in the previous applications. For rotatably supporting the outer end of shaft 20 a sleeve 29 is mounted within the housing 19 and has a first bearing 30 at its inner end and a second bearing 31 provided with a flange 32 extending outwardly of the sleeve and shaft housing. A wheel hub 33 is rotatably mounted on the outer periphery of the second bearing 31 being retained thereon by the flange 32, a third bearing 34 being mounted on the inner periphery of the second bearing 31 rotatably supporting the outer end of the shaft 20. A star wheel 35 is removably secured to the wheel hub 33 by machine screws 36, the shaft 20 being provided with a shoulder 37 (Fig. 2) outwardly of the outer surface of the star wheel 35 against which shoulder the washers 37A and cutting discs 27 and 28 are urged by the retaining nut.

An attachment comprising a hollow elongated body 38 for mounting in a generally radial direction from the shaft 20 is provided with a tubular bushing 39 having a flange 40 at its outer end, the body 38 being bored to receive the bushing 39 with a pressed fit, a second wheel hub 41 being rotatably mounted on the outer periphery of the bushing 39 with the hub portion thereof being received within a skirt portion 42 formed by an enlarged bore in the body 38 whereby dirt is prevented from coming into contact with the hub portion 41, the hub being retained on bushing by the flange 40. A bearing 43 is mounted within the tubular bushing 39 and is rotatably supporting a radially extending shaft 44, a second bearing 45 being provided for rotatably supporting the inner end of shaft 44. The outer end of radial shaft 44 is provided with a shoulder 46 and a threaded extension 47 (Fig. 2), the shoulder 46 being located outwardly of a guard wheel 48 which is removably secured to the hub 41 by machine screws 49. At least one cutting element which may be in the form of a tooth disc 50 is secured to the threaded extension 47 in a suitable manner as by having a threaded central portion or by the use of an additional nut or the like. A beveled gear 51 is fixed to the inner end of shaft 44 by any suitable means such as a keyway or the like. The upper portion of the body 38 provides a gear casing in which a stub shaft 52 is rotatably mounted in bearings 53, 54 and the stub shaft 52 has a beveled gear 55 fixed thereto which meshes with and drives beveled gear 51. The stub shaft 52 is provided with a threaded inner bore 56 which threadedly receives shaft extension 26, the inner end of the stub shaft 52 being provided with a polygonal outer surface 57 which serves as a nut for applying and removing the attachment.

The gear box of the hollow body 38 is closed by a cover 58 which has an outwardly projecting rod 60 with a threaded extremity 61 which carries a wing nut 62, such threaded extremity 61 passing through a slot 63 in a bent-over portion of a retaining clip 64, the other end of the retaining clip being provided with a hook 65 which engages the inner edge of a guard 66, the guard 66 being in the form of an arcuate fender with radially projecting supporting spokes 67 which converge into a strap 68 forming a hub which surrounds the outer end of the housing 19 and being held in clamping relation by means of a bolt 69 passing through the free extremities of the strap in a well known manner similar to conventional hose clamps whereby the angularity of the fender may be adjusted as desired and fixed in position. The retaining clip 64 and the inner end or shoulder 70 of the bent-over portion of the clip with rod 60 and nut 62 positively retains the body 38 in adjusted position.

From the above description it is believed that the operation of the present machine is obvious. The machine may be used without the attachment by loosening the nuts 57 and 62 and removing the attachment, the machine may then be used with the guarding wheel or disc 35 serving to prevent contact of the rotating cutter blades 27 and 28 with hard objects such as a marker in a cemetery, side walks or the like. The star shaped guarding wheel 35 is freely rotatable and being out of contact with the rotating shaft 20 will remain substantially stationary unless such guarding wheel engages an obstruction in which case it will raise the housing 19 and the cutter discs 27 and 28 out of contact with the obstruction. In the prior devices friction between the power shaft and the guarding wheel cause the guarding wheel to rotate resulting in vibration due to the rotation of the unbalanced guarding wheel with the eccentric weight thereon. The guarding wheel 35 therefore prevents marring of obstructions while the sharp teeth thereon permit penetration of the earth a sufficient amount so that the cutting discs 27 and 28 will produce sufficient cutting into the earth to produce a neat trench around the edges of side walks and the like. It will be evident that the angularity of the cutting blades can be adjusted by pivoting the motor supporting cradle 16 and housing 19 about the vertical shaft 18 by placing the adjusting rod 17 in one of the pairs of lugs 82 supported on the inverted U-shaped frame 10, the elevation of the cutting discs being adjustable by means of the rod 17. It will be evident that a pin such as a cotter pin will be inserted in registering openings in the pairs of lugs 82 and one of the openings in adjusting rod 17 so as to lift the left side of the motor as seen in Fig. 1 or lower the left side of the motor. It will also be evident that the pairs of lugs 82 are spaced partly similar to lugs 319 and 320 in Fig. 4 so that the angularity of the tool carrying shaft can be changed so that the relation of the planes of the cutting disks 35 can be arranged parallel to the direction of movement of the vehicle or at an angle thereto. The vertical adjustment of shaft 18 is controlled by movement of the forked guiding handle shown in part by tines 71, 72 pivoted to the vehicle. The vertical shaft 18 telescopes in the vertical tube 77 fixed to the side frame 11, the vertical shaft 18 being pivoted to the housing 19 and the top of the shaft 18 being connected to a cable 74 which passes over pulleys 76 at the top of the vertical tube 77 so that the vertical shaft 18 may slide up and down and may also rotate. The cable passing over pulley 76 is adjustably secured to the pivoted handle 72 so that movement of the handle will pull on the cable 74 and such adjustment is maintained by the adjusting link 78 pivoted to the handle 72 and secured in adjusted position by a bolt 80 fixed to the tube 77 and adjustably securing the link 78 in position by the wing nut 81. It will be evident that various adjustments can be obtained for depth of cutting and angular position of the cutter disks to obtain the desired width of trench and the desired depth of cut.

Figure 2:
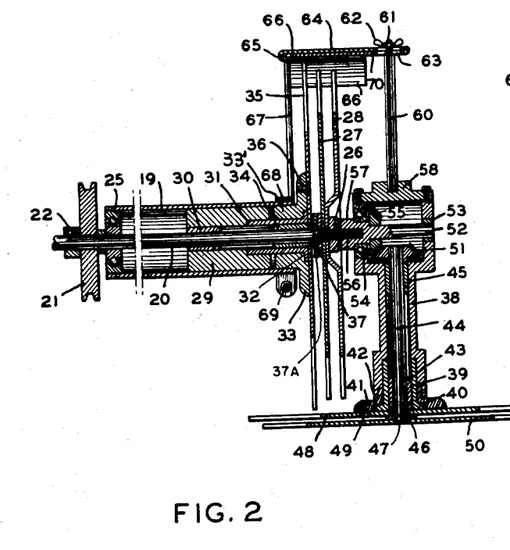
Fig. 2, a vertical section through the drive shafts of the machine of Fig. 1, showing the drives for the cutting discs as well as the supports for the freely rotatable guarding discs.
Figure 3:
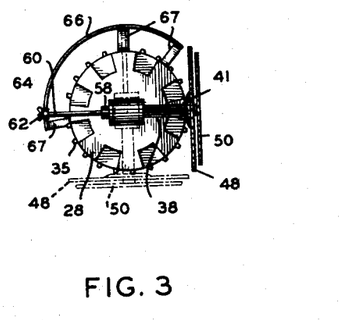
Fig. 3, an end view of the cutting discs shown in Fig. 1, with the horizontal cutting discs in an adjusted vertical position.

When the attachment is mounted on the threaded extension 26 of the power shaft 20 as shown in the drawing, the cutting disc 50 thereof may be arranged in a horizontal position shown in full lines in Figs. 1 and 2 for smoothing out a surface such as ridges in a road or a path or the like and in this position the cutting disc may serve as a grass trimmer for trimming grass close to buildings, telephone poles, tombstones or the like since the edges of the teeth of the disc 50 and the speed of rotation thereof are of a character which can accomplish this result.

If desired the cutting disc 50 and the guarding wheel 48 may be adjusted to a different angular position such as at 45° to the ground for obtaining intermediate cutting action and if desired the attachment may be adjusted to an inoperative position while the cutting discs 27 and 28 are used in a normal manner. The adjustment is obtained by the retaining clip 64 and/or the strap 68 whereby the parts may be adjusted to more exaggerated positions if desired.

The vertical adjustment of the housing 19 and the cutters, and guarding discs is obtained by the vertical movement of slidable shaft 18 which is closed at its upper end, with an end wall 73 through which a cable 74 passes; such cable having an enlargement 75 at its lower end, in order that vertical movement of the cable will cause corresponding movement of the slidable shaft 18 and drive shaft housing 19, the cable 74 being guided between a pair of pulleys 76, one behind the other, at the upper end of a tubular guide 77 fixed to the U-shaped side frame 11, the cable 74 extending upwardly and engaging one tine 72 of the handle and being adjustively fixed to the handle by means of a hook which may engage in any one of a series of perforations in the portion of the handle (not shown) whereby pivotal movement of the handle will cause raising or lowering of the housing 19. The handle of the vehicle shown in Fig. 1 is broken away and such handle normally extends upward and is forked at the bottom to provide the tines 71 and 72.

To fix the position of the housing 19 and the cutting and guarding discs a slotted strut 78 is pivotally connected between collars 79, 79 on a horizontal portion of the tine 72, the slot of said strut embracing a threaded stud 80, fixed to the tubular guide 77 the strut being fixed in position by a thumbscrew 81 or the like for clamping the strut in adjusted position.

It will thus be seen that vertical adjustment may be obtained and also a pivotal adjustment may be had about the upstanding shaft 18, by positioning the rod 17 in one of the lugs 82 one or more such lugs 82 being provided on the bight portion of the U-shaped frame 10.

Referring more particularly to Figs. 4 to 7, a gardening machine similar to that shown in Fig. 1 includes inverted U-shaped frames 310, 311 and cross members 312, 313 which are secured together by welding or the like, and such frame is supported by rear wheels 314, 314 and front caster wheels 315, 316. The frame supports a motor 317 upon a suitable cradle 317A which is adjustable by means of a vertical adjusting rod 318 retained in U-shaped lugs 319 or 320, the other end of the cradle being supported for vertical and pivotal adjustment in the upstanding tubular shaft 321 in a manner similar to that previously described. Adjustably connected to the cradle is the cylindrical drive shaft housing 322 which is suspended from vertical supporting shaft 323 slidable in the tubular guide 321 similar to tubular guide 77 of the modification shown in Fig. 1, such vertical supporting shaft 323 being pivotally connected to the drive shaft housing 322 by a pivot stud 324 passing through the L-shaped brackets 325 which L-shaped brackets are fixedly secured to the drive shaft housing 322 and adjustably mounted on the motor supporting cradle. Rotatably mounted within the drive shaft housing 322 is the drive shaft 326 which is driven in the usual way from the motor 317 through belt and pulley drives 327, such shaft being rotatably supported at its outer end by an antifriction bearing 328.

An attachment housing 329 includes a cylindrical body portion extending as shown at right angles to the drive shaft housing, and such attachment housing includes a socket 330 which snugly receives the outer end of drive shaft housing 322 which arrangement prevents radial movement and permits rotary and axial movement of the attachment housing. A brace 331 secured to the attachment housing at one end is provided with a strap 332 fixed to the other end which strap 332 surrounds the drive shaft housing 322 and by means of a bolt 333 clampingly maintains the parts in fixed assembled condition or upon loosening of such bolt, the attachment may be removed by axial movement from the drive shaft housing 322.

The drive shaft 326 is provided with a shoulder 326A which abuts the inner race 334 of the bearing 328, and such inner race may be somewhat elongated for taking an axial thrust, and a suitable sleeve 335 is provided which abuts against the boss of a bevel gear 336 which is fixed on the shaft by a set screw 337 or the like. Said shaft 326 projects outwardly beyond the attachment housing 329 through an enlarged opening 329A and carries a spacing sleeve 338 against which cutting disks 339 and 340 are held by an attaching nut 341. Suitable sealing rings are provided for retaining the grease in the bearings and preventing dust from entering the attachment housing. For obtaining access to the set screw 337 one or more openings 342 (Fig. 4) are provided in the housing 329.

A tool supporting shaft 343 is rotatably mounted within the housing 329 by anti-friction bearings 344, 345 which bearings are preferably of the permanently lubricated type. Upon the upper end of shaft 343 a bevel gear 346 is mounted in meshing engagement with bevel gear 336 for producing rotating motion of shaft 343 in one direction. If it is desired to rotate shaft 343 in the opposite direction, the gear 336 on shaft 326 may be secured in the dotted line position 347.

A cutting bar or cutting disc 348 is fixed to the shaft 343 by suitable means such as threads on the projecting end of the shaft 343. The cutting disk 348 is provided with a hub which is provided with female screw threads which receive the male screw thread on the lower end of shaft 343. If desired a set screw may be used in addition to maintain the cutting disk against unintentional removal. However, it will be evident that the screw threads are arranged to tighten the cutter disk on the shaft as the shaft is rotated by the power of the motor. The replaceable cutting blades 349 are carried by the cutter bar 348 for mowing grass or other vegetation. The cutting disk 348 may additionally be secured by a set screw or the like 348A which set screw may be in addition to the screw threads previously mentioned or a substitute therefor. To prevent the cutting blades 349 from contacting and marring vertical obstruction 350 such as a tombstone or the like, a circular guarding disk 351 is rotatably mounted on the exterior of the attachment housing 329 by means of anti-friction bearing 352 which is held in place by a projecting shoulder 353 on the housing against which the inner race abuts and a nut 354 threaded onto the lower threaded end of the housing 329 abuts the other end of the inner race thereby removably securing the guarding disc.

Figure 4:
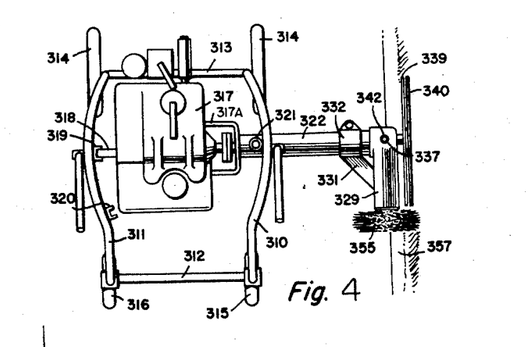
Fig. 4, a top plan of another form of the edging equipment showing a brush for removing loosened material cut by the cutting discs.

A brush 355 having threaded hub 356 is secured to the tool supporting shaft 343 by threading engagement with the threaded end of such shaft. In Fig. 4 the brush 355 is shown in one operative position so that the debris collecting on the sidewalk or curb 357 will be brushed away simultaneously with the operation of the cultivating or cutting discs 339 and 340 thereby saving the cost of manually sweeping such debris after the edging operation.

Figure 5:
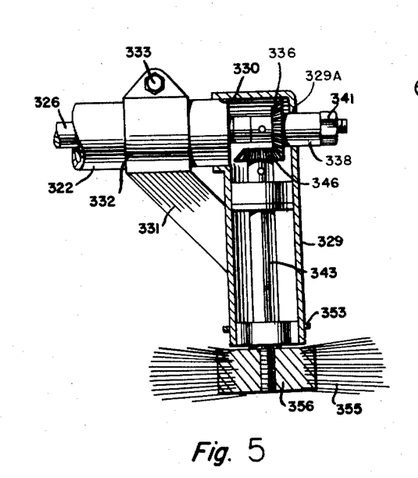
Fig. 5, a transverse section through the brush and drive of Fig. 4, showing the drive for the brush and the mounting of the brush support.
Figure 6:
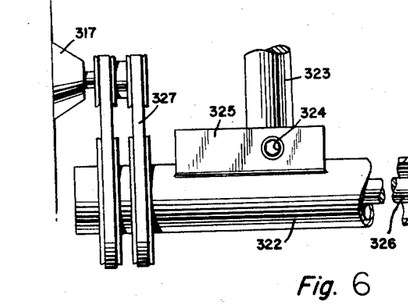
Fig. 6, a fragmentary vertical section of the drive shaft and drive shaft housing shown in Fig. 4, with a guarding attachment mounted on the brush support and a cutting device substituted for the brush.
Figure 7:
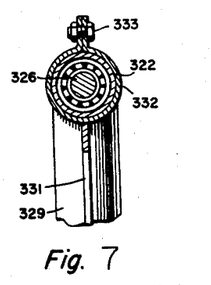
Fig. 7, a section taken on the line 7—7 of Fig. 6, showing the adjustable mounting for the cutter substituted for the brush.

In Fig. 5 the brush is shown mounted on the attachment with the cutting blades omitted permitting the machine to be used merely as a brushing machine. It will be apparent that a brush having the bristles extending axially of the tool supporting shaft may be substituted for the radially extending bristles if desired. The cutting bar 348 may be used while the cultivating or cutting discs 339 and 340 are in place, if desired, but such cultivating or cutting discs may be removed to reduce danger to workmen.

The attachment may be swung up out of the way while the cultivating disks 339 or 340 are used in the normal way thereby reducing the time required to change from one operation to another.

The edging machine shown in Figures 8 to 12 inclusive, comprises an axle 400 on which a freely rotatable left wheel 401 and a driven right wheel 402 are mounted, A pair of J-shaped frame members 403, 404 are fixed at their lower ends to the axle 400 the upper ends being connected together in spaced apart relation by a bar 405. A pair of inverted L-shaped handle members 406, 407 have their lower end fixed to the bar, 405, with handle grips 408, 409, on the upper end whereby the vehicle can be guided by a workman following the wheels 401, 402. It will be apparent that the J-shaped frame member and the adjacent invert L-shaped handle member may be made in one piece.

A motor 410 is mounted for vertical movement relative to the axle 400 by means of a rectangular frame formed of a pair of J-shaped side members 411, 412, connected at their lower ends by a tube 413 and connected at its upper end by a similar tube 413A, the lower end being pivotally mounted in upstanding lugs 414, 415 on J-shaped frame members 403, 404 through which a bolt 416 passes for pivotally mounting the rectangular framework, the upper end of such framework being connected by means of a bolt for 417, passing through lugs 417A projecting downwardly from the base of the motor.

The upper end of the motor 410, is guided in its movement by means of a link 418 having its ends bent at a right angle with one end passing through an aperture in a lug 419 fixed on the bar 405 of the handle. The other end of the link 418 being pivotally connected to a sleeve formed in a metal strap 420 secured to the motor 410 by one or more bolts 421 such as cylinder head bolts or the like on the motor 410.

The motor 410 is counterbalanced by means of a spring 421, which is connected at its lower end to a lug 422, fixed on a side member 412 of the rectangular motor supporting frame. The upper end of the spring is connected to a threaded eye bolt 423, passing through an aperture in cross member 405 and is adjustable by a thumb nut for varying the tension in the spring to obtain the proper counterbalance for supporting a motor. It is believed obvious that the motor 410, the link 418 and the rectangular frame formed of J-shaped side members 411, 412, and the J-shaped handle frame members 403, 404 provide a quadrilateral figure having pivots at their connections so that the motor 410 may be raised or lowered by the movement of link 425; the tension spring 421 by reacting between the rectangular frame member formed of side members 410 and 411 and the cross member 405 serves to counter-balance the motor. This counter-balancing effect can be adjusted by the nut 425 threaded to an eye bolt 423. The motor is raised and lowered by means of a link 425, having a hook 426 at its lower end, with a laterally extending portion 427 passing through one of a series of apertures 428, in side member 411, the laterally extending portion being secured in position for pivotal movement by a cotter pin, or the like, the selected opening 428 serving to vary the mechanical advantage in accordance with the conditions encountered. The upper end of the link 425, is pivotally connected by means of a pin 429, passing through a rectangular lever 430. The rectangular lever 430 completely encircles the handle portions 406, 407 and is pivoted at 431 to a cross piece 432 between such handle portions 406, 407 to provide a balancing handle so that the operator can engage extension bars 433 and 434 of the rectangular lever 430 to maintain the proper position of the link 425 and of the motor 410 to accurately control the position of the cutters. The rectangular lever 430 has handle extensions 433 and 434, which may be gripped with the fingers while the hands of the operator embrace the handle grips 408 and 409, whereby the operator may have positive control for raising and lowering the motor and any mechanism such as cutter and guarding discs secured thereto, the motion approximating a rectilinear straight line movement.

The lawn edger is maintained in upstanding inoperative position by means of a U-shaped framework 435, having the free ends of its legs pivotally connected to the lugs 414 and 415, by the bolt 416. The tension on the bolt 416 is adjustable by any suitable means such as the bolt being threaded, or by the use of a spring washer or the like so that the U-shaped framework 435 may be maintained in its supporting position or may be retained in an inoperative or raised position.

A bracket 436 extending laterally to the left above the driving wheel 402 is secured by a plurality of bolts 437 passing through lugs 437A (Fig. 13) of the bracket 436 and threaded into the motor 410, the bracket 436 having an offset 438 therein with such offset having a tubular bearing 439 fixed thereto, the bearing 439 being in alignment with the main bearing 440 of a crank shaft 441 of the motor 410. The crank shaft 441 is provided with a threaded axial bore 442, into which a threaded end 443 of a power shaft 444 is screwed in order that rotation of the crank shaft 441 will cause positive rotation of the power shaft 444.

Rotatively mounted on the shaft 444 is a housing 445 in which a gear 446 (Fig. 11) is located, such gear 446 being fixed to the shaft by means of a set screw 447 or the like so that gear 446 is positively rotated. The gear 446 meshes with a large gear 448 fixed to rotate with a small gear 449, which small gear meshes with and rotates a large gear 450, fixed on a shaft 451, which shaft is rotatively mounted in suitable bearings in the gear housing 445. The shaft 451 projects inwardly and has a belt pulley 452 fixed thereon by suitable means such as a set screw, a belt 453 passing over such pulley 452, and over another pulley 454, fixed to the driving wheel 402, for driving the machine over the ground.

To maintain the belt in tight or loose condition for driving the machine over the ground or permitting the machine to stop, a boss 455 is rotatively mounted on the shaft 451 and retained thereon by any suitable means, said boss 455 having a downwardly extending internally threaded lug 456 into which a threaded rod 457 is adjustably screwed and maintained in adjusted position by a lock nut 458. Secured to the lug 456 is a U-shaped guide or yoke 459, which may be integrally fixed to the lug 456, with each leg of such guide or yoke 459 being in a position to guide the belt for 453, and to prevent the belt from bending outwardly in order that such belt 453 may be released from the belt pulleys 454 and 452, when such pulleys are moved together when a driving relation is not desired.

The lower end of the rod 457 is received in a radially extending bore of a socket 460, which is integral with a boss 461 rotatively mounted on the axle 400. The boss 461 has a bell crank lever 462 pivotally mounted by a pin 463 in suitable lugs in the boss, the upwardly extending arm of the bell crank lever being connected to a Bowden wire passing through a flexible conduit 465 (Fig. 11), which flexible conduit is fixed to a bracket 466 on the socket 460 so that movement of the Bowden wire 464 will cause the bell crank 462 to pivot and telescopically move the rod 457 upwardly, thereby tightening the belt 453, the belt being shown in full lines in the released or non-driving position in Fig. 11. The Bowden wire and its sheath extend upwardly to a control lever 467 whereby the operator may control the forward movement. The conduit 465 is omitted in Fig. 8 so that the parts may be more clearly seen.

In addition to the use of the machine, while being guided by a workman following the machine, a two wheeled sulky having a forwardly extending tongue and an upwardly extending seat, may be provided and the forward end of the forwardly extending tongue may be pivotally connected to an upwardly extending stud 468 (Fig. 9), projected upwardly from the axle 400, and the operator may then ride on the sulky to reduce the manual effort involved and to increase the speed of movement, as well as making the work more attractive to labor.

A horizontal cutter next to the motor 410 is secured in position by a downwardly extending convex or tubular member 469, which has a transversely extending bore through a boss 470, fixed to the upper end of the tubular member 469. The boss 470 being split and provided with upstanding lugs 471 and 471' is clamped by means of a bolt 472 passing through such lugs and serving to clamp the boss 470 around the tubular bearing 439, so that the tubular member 469 may be positioned in substantially vertical position or may be rotated if desired. A gear supporting body 473 provided with aligned bearings 474 rotatively supports a shaft 475, which carries a pulley 476 over which a belt 477 passes such belt also engaging a driving pulley 478 suitably fixed to the shaft 444, by a set screw or the like. Extending upwardly from the gear supporting body and fixed thereto are a pair of channel members 479, 480, which embrace the downwardly extending tubular member 469 which tubular member has an aperture 481A extending therethrough, the channel members 479, 480, having registering slots 481, through which slots and aperture 481A, a bolt 482 passes for securing the gear supporting body 473 in adjusted vertical position.

The gear supporting body 473 rotatively supports a vertically extending shaft 483, in suitable bearings and carries a bevel gear 484 fixed thereto, which meshes with a bevel gear 485, fixed on the shaft 475, in order that power through the belt 477 will be transmitted to the shaft 483.

The shaft 483 is threaded at its lower end and cutting disc 486 is fixed thereto by having a threaded hub threaded onto the shaft 483. The cutting disk is threaded onto the threaded shaft in a manner similar to that shown in Fig. 2 by the shaft being threaded at its outer end and the disk being internally threaded to cooperate therewith. A guarding disc 487, having a hub 488 fixed thereto is rotatably mounted on a sleeve 489, mounted in the gear supporting body 473 so that guarding disc 487 may rotate but is not affected by the rotation of power rotated disc 486.

Figures 8, 13:
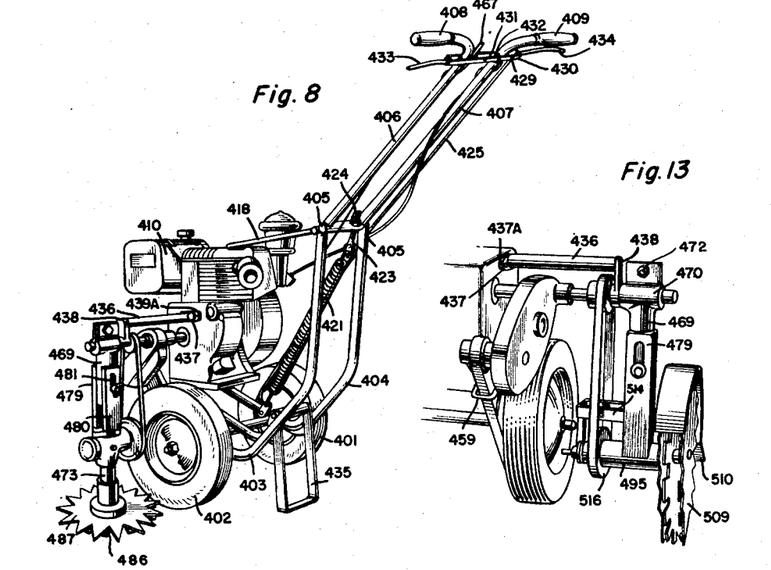
Fig. 8, a perspective of another form of the invention in which a horizontal cutting disc is driven through a belt drive and the cutter disc is raised and lowered in a substantially straight line rectilinear vertical movement under the direct control of the operator at all times.
Fig. 13, a fragmentary perspective of the machine shown in Fig. 8, with an upstanding cutter and drive substituted for the horizontal cutter.
Figure 9:
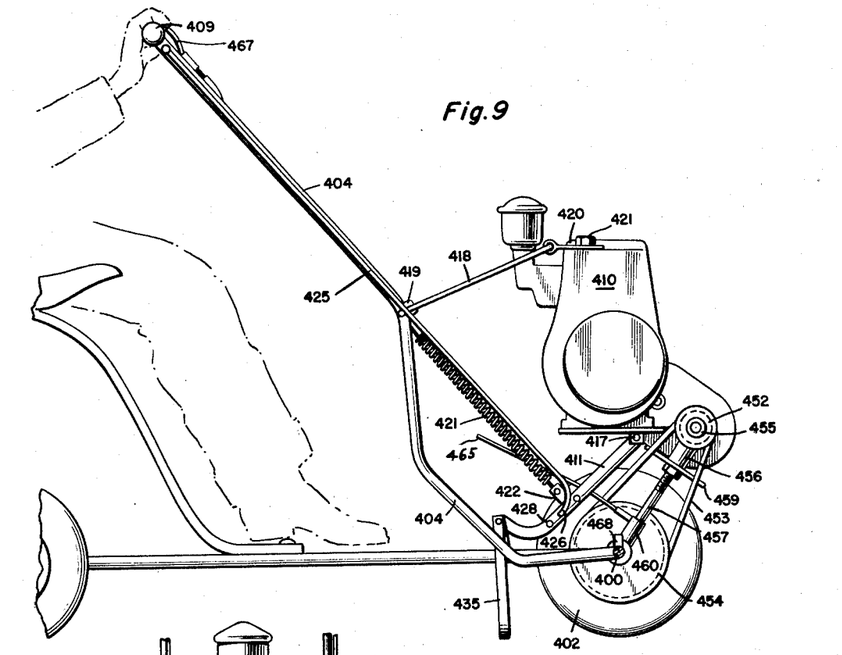
Fig. 9, an elevation of the edger of Fig. 8, with the right ground engaging freely rotatable wheel omitted, showing the belt drive for driving the left ground engaging wheel from the source of power.
Figure 10:
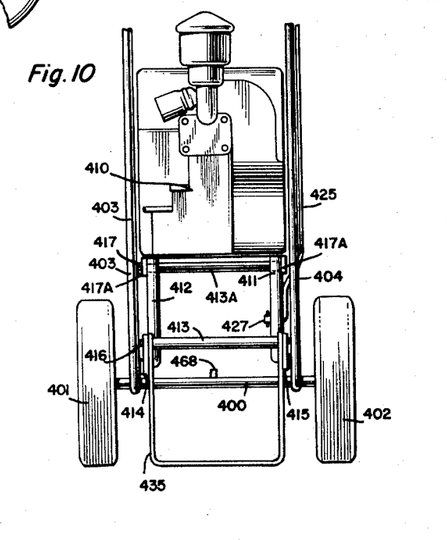
Fig. 10, a rear elevation of the gardening machine of Fig. 8, showing the stand for supporting the machine in inoperative condition.
Figure 11:
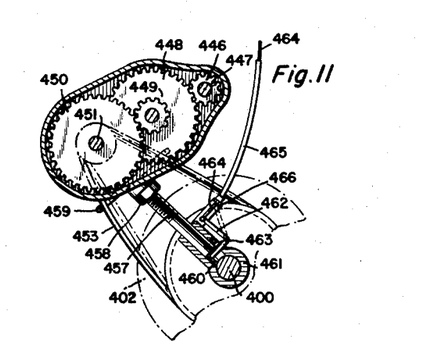
Fig. 11, a vertical section taken substantially on line 11—11 of Figs. 12 and 14 showing the drive for the driven ground engaging wheel and the control therefor.
Figure 12:
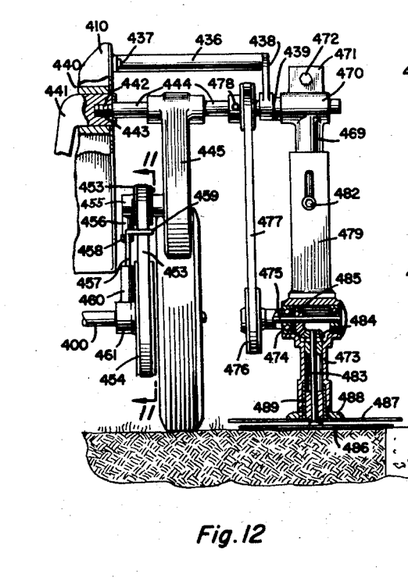
Fig. 12, a fragmentary vertical section taken through the drive for the horizontal cutter of Fig. 8.
Figure 14:
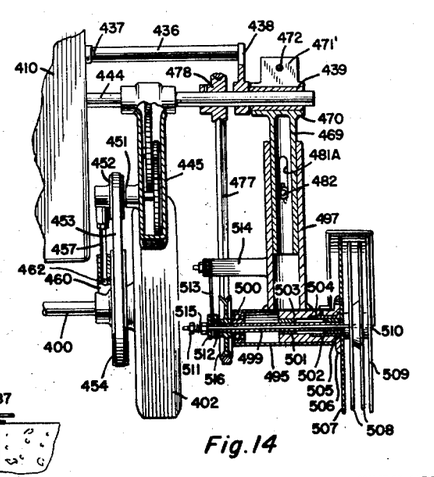
Fig. 14, a vertical section through the support and drive for the upstanding cutters of Fig. 13, and through the gear drive for the driven ground engaging wheel.
Figures 15, 16:
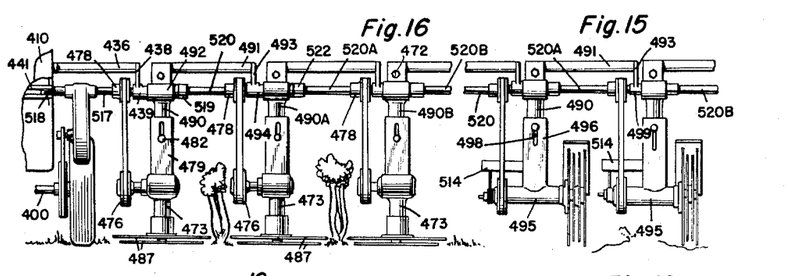
Fig. 15, a fragmentary front elevation of a plurality of upstanding cutters similar to those shown in Figs. 13 and 14, illustrating how any number of laterally spaced cutters can be mounted on the machine for cultivating on opposite sides of a row of vegetation.
Fig. 16, a fragmentary front elevation illustrating how any number of horizontal cutters can be mounted and driven in laterally spaced relation supported from the machine for cultivating between rows of vegetation such as celery.

Referring to Figure 16, other units may be applied laterally of the gear supporting body 473, by substitution of a downwardly extending tubular member 490, for tubular member 469. The member 490 is similar to member 469 except a laterally extending arm 491 is fixed to the upper end of a split boss 492, and is provided with an offset 493, carrying a tubular bearing 494 a plurality of a downwardly extending gear supporting bodies 473, may be mounted upon the downwardly supporting tubular members 490, 490A, 490B and the end or outboard member may be the original downwardly extending tubular member 469. The gear supporting bodies 473 are provided with upwardly extending channel members 479, 480 and securing bolts 482 so that pivotal adjustment may be suitably obtained. Drive pulleys 478 are provided as required to drive the pulleys on the gear supporting bodies 473. Referring to Figs. 13, 14 and 15, a horizontally extending housing 495, is fixed to the lower ends of channel members 496, 497 which channel members embrace a downwardly extending tubular member 469 or a similar tubular member 490, and is fixed in adjusted position by means of bolt 482 passing through the aperture 481A in the downwardly extending tubular member and the corresponding slots 498 in the channel members 496 and 497, thereby providing for vertical adjustment.

A tubular shaft 499 is rotatively supported in a ball race 500 and a pair of bushings 501, 502, the bushing 501 being pressed into a sleeve 503 and the bushing 502 being carried by a second sleeve 504 mounted in a bore in sleeve 503, said sleeve 504 being provided with an outwardly extending flange 505, which retains a hub 506 thereon, the hub 506 having a guarding disc 507 fixed thereto by bolts or the like passing through the guarding disc 507 and threaded into the hub 506. It will be evident that the guarding disc 507 may freely rotate and is unaffected by the rotation of tubular shaft 499. The tubular shaft 499 is threaded at its outer end and receives internally threaded hubs on cutting disc 508, the tubular shaft being provided with a shoulder to prevent such cutting discs from contacting the guarding disc 507.

A second guarding disc 509 is fixed to a shaft 510 which passes through the tubular shaft 499 passing completely through the tubular shaft 499 and projecting inwardly therefrom, being threaded at its inner end and receiving a nut 511 thereon. The inner end of the shaft 510 is provided with key way or is flattened and receives a pair of washers 512, which are keyed to and must rotate with the shaft 510 because of the non-circular characteristic of the shaft at that region. Sandwiched between washers 512 is a strap 513, having an aperture larger than the shaft 510 in order that shaft 510 may freely rotate therein, the strap 510 being secure to a U-shaped bracket 514 fixed to the channels 496, 497. A spring 515 is positioned between nut 511 and the washers 512 and by adjusting the nut 511, the friction between the washers 512 and strap 513 may be controlled so as to resist rotation of the shaft 510 whereby the shaft 510 will normally remain stationary in the tubular shaft 499 even though such tubular shaft 499 rotates under power.

The washers 512 and/or the strap 513 may be provided with friction linings to increase the friction if desired, such friction linings being in the nature of a clutch or brake lining, or the like. The cutters 508 are rotated by a pulley 516 fixed to the tubular shaft 499 by any suitable means such as a set screw or the like, the pulley 516 receiving its power through a belt 477, driven from a pulley 478, affixed to the shaft 444, whereby the cutting discs are rotated. The slots in the channel members 496, 497, and the aperture 481 in the tubular member 469 or the tubular members 490 provide for adjusting and tightening the belt 477.

If desired, a combination of the horizontal cutters may be made with vertical cutters under some conditions, the vertical cutters being suitable for some purposes and horizontal cutters for others, thereby providing for greater flexibility of operation.

To provide for adjusting the length of the shaft extending from the motor when a plurality of cutters are mounted in laterally spaced relation, the shaft may be made of sections, one section 517 having suitable threads 518 for reception in the threaded end of the crank shaft 441 of the motor, usable when one cutter attachment is employed. A collar 519 may be provided on the outer end of the shaft section 517 and is adapted to receive a shaft section 520 with its inner end threaded into similar cooperating threads in the collar 519 of the shaft 517. The shaft section 520 has a boss 522 similar to collar 519 for receiving other shaft sections 520A, similar to shaft section 520.

Figures 17, 18, 19, 20, 21:
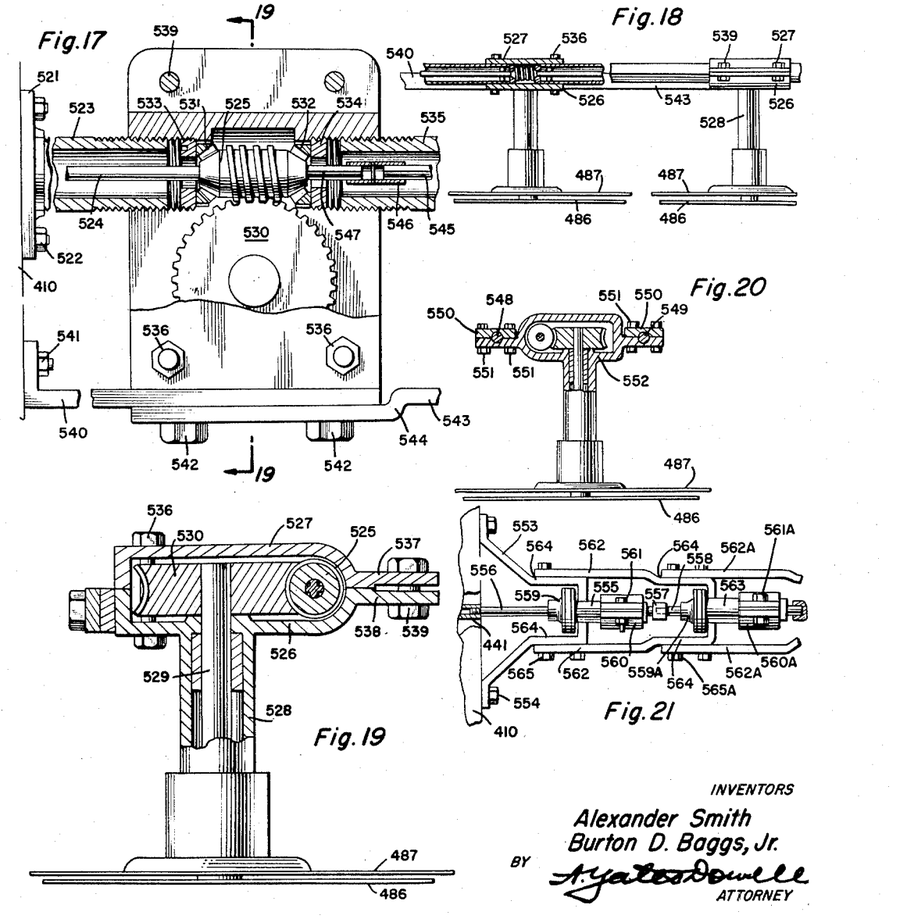
Fig. 17, a fragmentary sectional plan of worm drive and support for horizontal cutters.
Fig. 18, a fragmentary rear elevation of the drive and support of Fig. 17 of a plurality of laterally spaced cutters.
Fig. 19, a section taken on line 19—19 of Fig. 17, illustrating the worm drive for the horizontal cutter.
Fig. 20, a section similar to Fig. 19, illustrating another form of support having two supporting rods.
Fig. 21, a plan of another form of support which is suitable for either the horizontal cutters or the vertical cutters and which can be built up in any length with any number of cutters.

Referring to Figures 17 to 19, a modified form of support and drive for the horizontal cutters is illustrated, as including a face plate 521 secured to the motor 410, by bolts 522 or the like, said face plate having a hollow tube 523 fixed thereto by any suitable means including being threaded thereinto. A shaft 524 is threaded at its inner end to crank shaft 441 of motor 410 in a manner previously described with reference to the modification shown in Fig. 12 and carries a worm 525 adjacent to its outer end, the worm being fixed thereto by any suitable means such as a set screw, spline, key, or the like.

A gear housing, including a lower housing portion 526, and an upper housing portion 527, a tubular portion 528, extending downwardly from lower housing portion 526, rotatively supports a vertically extending shaft 529 in suitable bearings, a worm gear 530 being fixed to the upper end of the shaft by any suitable means and meshing with the worm 525. The worm 525 is rotatively supported by tapered roller bearings 531, 532, the outer races of such bearings being supported and retained in position by annular plugs 533, 534 respectively, the housing portions 526 and 527 being suitably threaded to receive such plugs, and to receive the outer end of the tubular member 523, and the inner end of a tubular section 535.

The upper and lower portions of the casing are held together by bolts 536, 536, and rearwardly extending ears 537, 538 are clamped together by bolts 539, which bolts serve to clamp the plugs 533, 534 and the threaded tubular sections 523, 535 in fixed adjusted position after the proper adjustment of such plugs and tubular sections have been made to assure that the worm is in operative relation with the worm gear 530.

A plurality of gear housings can be arranged to provide a multiple series of cutters similar to those shown in Figure 16, with the driving mechanism entirely enclosed to make the apparatus more suitable for cultivating close to and underneath hedges and the like, and also rendering the apparatus useful for cutting dense vegetation in which case the guarding discs 487 may be omitted.

In some circumstances, the tubular supporting sections 523, 535 may be sufficient to properly maintain the gear housings in operative position, but for additionally insuring that such housings do not rotate about the tubular sections 523 and 535, a mounting strap 540 may be secured to the motor 410 by means of a bolt 541, such strap 540 extending outwardly to overlap the forward edge of the lower housing portion 526 and being fixed thereto by bolts 542, 542, passing through the strap and threaded into the housing portion 526. An extension strap 543 provided with an offset 544 is secured at its inner end by means of the bolts 542, 542 to the gear housing portion 526, the outer end of the strap 543 being secured to the next adjacent outer gear housing 526 whereby the second housing is secured in position. Likewise any number of gear housings may be provided for operating any desired number of horizontal cutters.

The drive for the next adjacent cutter may be obtained by a shaft section 545 having an enlargement 546 which may be splined internally for application to a splined end 547 on the shaft section 524, and additional units may be applied as required. If desired the enlargement 546 may be splined coupling with the inner end of shaft 545 correspondingly splined. The spacing of the units may be varied by the screw adjustment of tubular sections 523, 535, as well as by substitution of different lengths of tubular sections 535 and corresponding lengths of strap members 543. If desired the apertures in strap members 540, 543 may be slots to provide for adjustment.

With reference to Figure 20, a worm and gear drive is used in a manner similar to that described with reference to Figures 17 to 19, but the individual units are mounted on rods 548 and 549, which are secured to and extend outwardly from the motor 410, the units being held in clamped position by plates 550 suitably held in place by bolts 551, whereby the gear housings 552 of the units are secured in operative position.

In the modification of the invention of Figure 21, a Y-shaped bracket 553 is secured to the motor 410 by bolts 554, the Y-shaped bracket having a cylindrical bearing 555 in alignment with the bearing of the crank shaft, a shaft 556 being threaded into the crank shaft 441, and being rotatively supported in the cylindrical bearing 555, such shaft section 556 having an enlargement 557, which is internally threaded on its outboard side for receiving the next adjacent shaft section 558, for driving the next unit. The shaft sections 556, 558, carry pulleys 559, 559A which are similar to pulleys 478 previously described and such pulleys may drive horizontal cutters mounted in bodies 473 or may drive vertical cutters mounted in housings 495. A downwardly extending tubular member 560 similar to tubular member 469 is provided with a split boss at its upper end, and a bolt 561 to operate and clamp the downwardly extending tubular member in properly adjusted position.

For adding one or more units a U-shaped frame having legs 562, 562 is provided with a tubular bearing 563, at its bight portion such tubular bearing 563 being similar to tubular bearing 555 and adjustably receiving a downwardly extending tubular member 560A, which may be identical with members 469 or 560. Member 560A may carry a cutting unit at its lower end, and may be secured in position by means of the split boss and the adjusting bolt 561A. The inner end of the legs 562, 562 are secured to the stem or the flattened portions 564, 564 of the Y-shaped bracket 553 by means of a plurality of bolts 565. The shaft section 558 carries a pulley 559A, which drives the second unit.

Any member of U-shaped frames may be provided, a second U-shaped frame having legs 562A, 562A, being secured by bolts 565A, 565A to the outer end of the U-shaped frame 562, and carrying a bearing 563A at its outer end for receiving another downwardly extending tubular member similar to 560A. It is believed the addition of similar units will be obvious and that structure may be increased in width to enlarge the swath of cut of the cutting discs, as desired, and the U-shaped frames may be made of varying length or may be made adjustable by the use of slots in the legs thereof and suitable shaft extensions provided to obtain the desired spacing between the cutters. One or more diagonal braces may be provided to reduce the stress on the U-shaped frames, tubular sections or mounting brackets or the like.

From the above description, it is believed apparent how the apparatus of the present invention is used, but it may be pointed out the cutters are particularly useful for removing grass and weeds which overgrow the edges of sidewalks, with the horizontal cutting disc 486 serving to remove such grass to clearly uncover the edge of the sidewalk to make a clear outline, also weeds growing through cracks in the sidewalks may be effectively cut by disks 486. The cutting disc 486 may also be used for cultivating with the guarding disc 487 serving to prevent particles and stones from flying upwardly, the guarding disk 487 also preventing the cutting disk from contacting buildings, tombstones, edges of sidewalks and the like, adjacent the cultivated area. The cutters may be raised and lowered by a substantially straight line, vertical, rectilinear movement by the linkage shown, including the pair of links 411, 412 and link 418, whereby the cutting discs 486 are maintained in substantially horizontal position throughout the raising and lowering of the cutters from the maximum to minimum height.

The cutters are adapted to operate above the surface on which the wheels 401, 402 support the machine; therefore the apparatus is highly useful for working on the edges of a road with the machine being supported by its wheels on the road and cutting the vegetation beside the road which vegetation may be below the road level, as on a low shoulder or above the road level as a raised curb.

The vertical cutters and the horizontal cutters may be used interchangeably or some vertical cutters may be used with some horizontal cutters being driven and supported from one motor 410, and a minimum of time is required for substituting of one cutter for the other, thereby rendering the machine highly useful for many varieties of work.

The invention also includes a method of removing vegetation from the edges or from the surface of sidewalks, such as the vegetation which grows through cracks in the sidewalks or on the road, and with the guiding discs, there is practically no danger or damage to the sidewalks, roads, tombstones, buildings, or the like.

Although the cutters may be sharpened as desired, it has been found that the edge remaining after a shearing or cutting operation in the manufacture of the cutting disk from steel plates is satisfactory for much of the work to be done and consequently the equipment may be used in locations where stones are prevalent and the disks have been found to last much longer than the conventional two-blade cutters such as are used on many types of mowers. It has also been found that the circumferential edges of the discs may be sharpened by removing the guarding discs and contacting the circumferential surfaces of the cutting discs with a concrete sidewalk or the like, while the cutting discs are rotating.

With reference to the gear drive shown in Figs. 17 to 19, the cutting discs on adjacent units may be made with intermeshing cutting teeth, such teeth meshing in a manner similar to gear teeth but without contact providing complete cutting over the entire width of the units, such an arrangement being particularly useful for cultivating around orchards or the like.

It will be obvious to those skilled in the art that various changes may be made in the invention without departing from the spirit and scope thereof and, therefore, the invention is not limited by that illustrated in the drawings and described in the specification, but only as indicated in the accompanying claims.

What is claimed is:

1. A trimming machine for removing vegetation from areas adjacent hard objects such as buildings, tombstones, telephone poles or the like, comprising a vehicle for movement over the ground, a motor movably mounted on said vehicle for raising and lowering relative thereto, a bracket extending outwardly from said motor, a bearing mounted in offset relation on the outer end of said bracket, a shaft drivingly connected to said motor and rotatably supported in said bearing of said bracket, a downwardly extending member clampingly secured to said bearing on said bracket, a shaft housing mounted on said downwardly extending member for vertical adjustment, a shaft in said housing, a cutting disc mounted on said shaft in said housing, a drive means between said shaft in said housing and said first mentioned shaft for driving said cutting disc, a guarding disc supported from said housing adjacent said cutting disc for rotative movement, said cutting disc having no rotating effect on said guarding disc whereby said guarding disc will normally remain stationary during the rotation of said cutting disc, but said guarding disc may rotate by outside obstructions.

2. A trimming machine for removing vegetation from areas adjacent hard objects such as buildings, tombstones, telephone poles or the like, comprising a wheeled vehicle for movement over the ground, a motor movably mounted on said vehicle for raising and lowering relative thereto, a bracket extending outwardly from said motor, a bearing on said bracket outwardly of said motor, a shaft drivingly connected to said motor and rotatably supported in said bearing of said bracket, a downwardly extending member secured to said bracket, a shaft housing mounted on said downwardly extending member, a shaft in said housing, a cutting disc mounted on said shaft in said housing, a drive means between said shaft in said housing and said first mentioned shaft for driving said cutting disc, a guarding disc supported from said housing adjacent said cutting disc for rotative movement, said cutting disc having no rotating effect on said guarding disc whereby said guarding disc will normally remain stationary during the rotation of said cutting disc, but said guarding disc may rotate by outside obstructions.

3. The invention according to claim 2 in which means are mounted on the vehicle for raising and lowering the motor and the attached bracket and cutting disc.

4. The invention according to claim 3 in which said means includes parallel linkage structure to permit the raising and lowering movement.

5. The invention according to claim 2 in which the bracket is provided with an extension, a second cutting disc mounted on said extension in spaced relation to said first mentioned cutting disc whereby cultivation and cutting may be accomplished on opposite sides of a row of vegetation.

6. The invention according to claim 2 in which the cutting disc is disposed in a vertical plane.

7. The invention according to claim 2 in which the vehicle is supported on two wheels and is provided with a handle projecting upwardly and rearwardly, the motor being mounted on the vehicle with its center of gravity slightly behind the axis of the wheels, a ground engaging leg rearwardly of said wheels for supporting said vehicle in inoperative position.

8. The invention according to claim 2 in which a lug is provided on the vehicle for connection to a sulky to permit riding by an operator, and means interconnecting said motor with said vehicle are provided for rotating one of the wheels of the vehicle to move the vehicle and the sulky along the ground.

9. The invention according to claim 2 in which means are provided between the downwardly extending member and the shaft housing for adjusting the position of the shaft housing, and belt means between the shafts for driving the shaft in said housing from said first mentioned shaft.

References Cited in the file of this patent

UNITED STATES PATENTS

| | | |
|---|---|---|
| 2,707,361 | Thomas | May 3, 1955 |
| 2,719,398 | Hutchens | Oct. 4, 1955 |
| 2,719,400 | Lesesne | Oct. 4, 1955 |
| 2,721,433 | Berdan | Oct. 25, 1955 |
| 2,724,230 | Burmeister | Nov. 22, 1955 |
| 2,767,541 | Yacoby | Oct. 23, 1956 |